United States Patent [19]

Lamouche

[11] Patent Number: 5,366,258
[45] Date of Patent: Nov. 22, 1994

[54] FLEXIBLE COUPLINGS FOR FLEXIBLE TUBES DESIGNED TO BE ROLLED UP FLAT ON THEMSELVES

[76] Inventor: Jean Lamouche, 1161, rue Charles-Madame, F-60880 Jaux, France

[21] Appl. No.: 890,598
[22] PCT Filed: Jan. 11, 1991
[86] PCT No.: PCT/FR91/00018
   § 371 Date: Jul. 9, 1992
   § 102(e) Date: Jul. 9, 1992
[87] PCT Pub. No.: WO91/10858
   PCT Pub. Date: Jul. 25, 1991

[30] Foreign Application Priority Data

Jan. 12, 1990 [FR] France ................. 90 00356

[51] Int. Cl.⁵ .................................. F16L 47/00
[52] U.S. Cl. .......................... 285/260; 285/369; 285/95
[58] Field of Search ............. 285/369, 260, 95, 98

[56] References Cited

U.S. PATENT DOCUMENTS

| | | | |
|---|---|---|---|
| 1,385,220 | 7/1921 | Marquette | 285/260 |
| 2,547,983 | 4/1951 | Slattery | 285/71 |
| 3,033,594 | 5/1962 | Cushman | 285/97 |
| 3,899,198 | 8/1975 | Maroschak | 285/260 |
| 4,067,534 | 1/1978 | Frey | 285/369 |
| 4,097,070 | 6/1978 | Alda | 285/369 |
| 4,779,902 | 10/1988 | Lee | 285/260 |
| 4,807,913 | 2/1989 | Bartholomew | 285/369 |
| 4,865,362 | 9/1989 | Holden | 285/260 |

FOREIGN PATENT DOCUMENTS

| | | |
|---|---|---|
| 1650166 | 8/1970 | Germany . |
| 3605605 | 9/1987 | Germany . |
| 1007245 | 10/1965 | United Kingdom . |

*Primary Examiner*—Eric K. Nicholson
*Attorney, Agent, or Firm*—Kramer, Brufsky & Cifelli

[57] ABSTRACT

Flexible assembly designed for coupling flexible tubes comprising a sleeve (1) designed to receive the ends of two tubes to be coupled and provided with assembly means designed to cooperate with complementary assembly means carried by the ends of said tubes, characterized in that the assembly means of sleeve (1) have an annular chamber arranged in the inner wall of the sleeve, and whose edges form shoulders with reflex angles (3, 3') giving to it, in axial section, a dovetailed profile, and in that the complementary assembly means carried by tubes (7, 8) to be coupled are made up of tubular stops (5) permanently attached onto the ends of tubes (7, 8), the stops having an outer diameter corresponding to the inner diameter of the annular chamber arranged in sleeve (1) and at least their edge designed to cooperate with the corresponding shoulder with reflex angle of the chamber having a complementary inclined profile (6) of that of shoulder (3) with reflex angle, and in that the length of the annular chamber is greater than the sum of the lengths of stops (5) attached onto the tubes to be coupled.

9 Claims, 2 Drawing Sheets

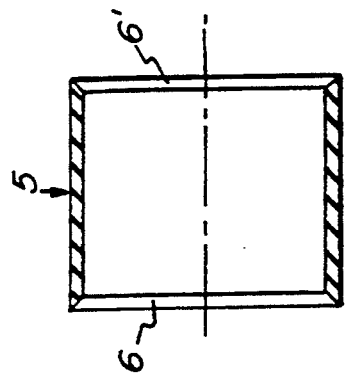
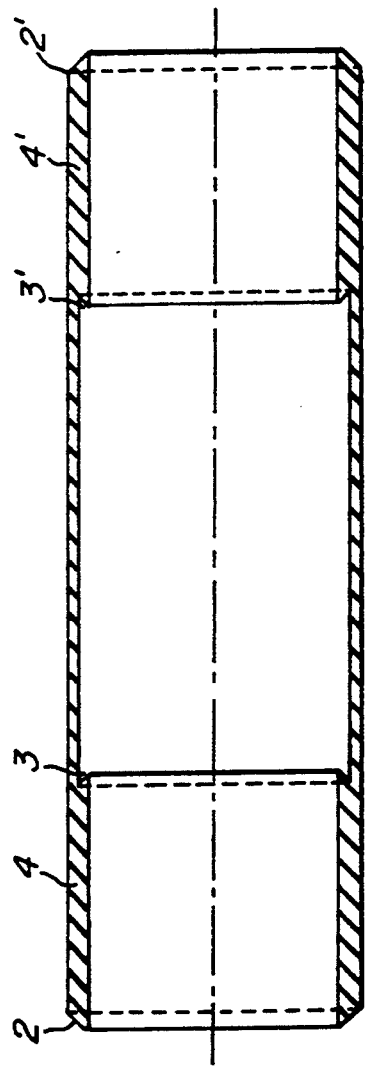
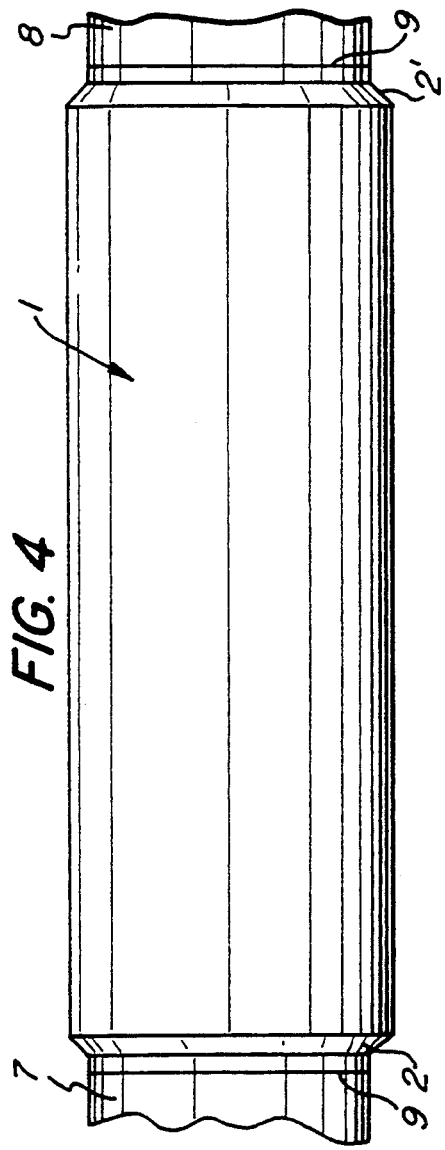

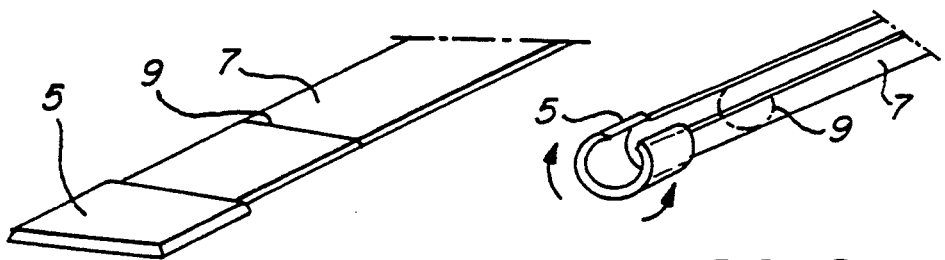
FIG. 5
FIG. 6
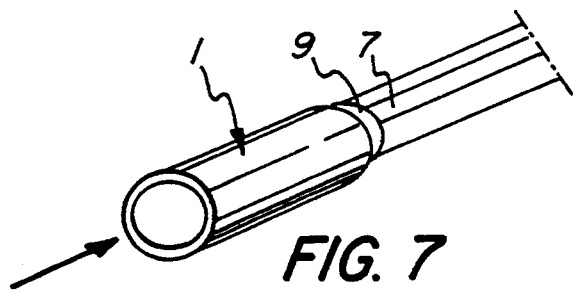
FIG. 7
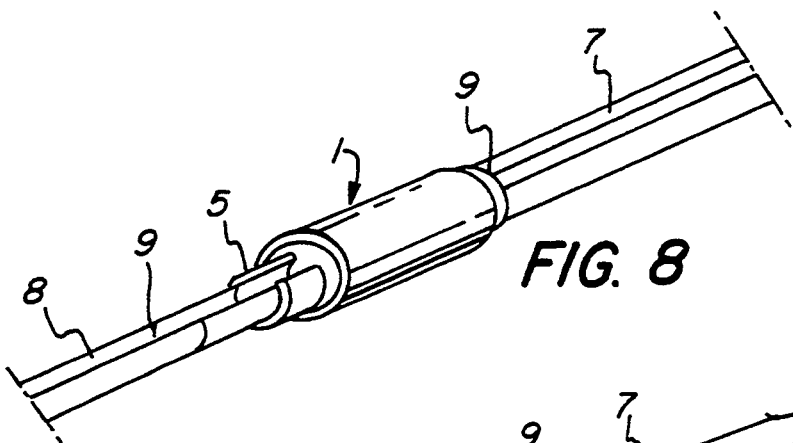
FIG. 8
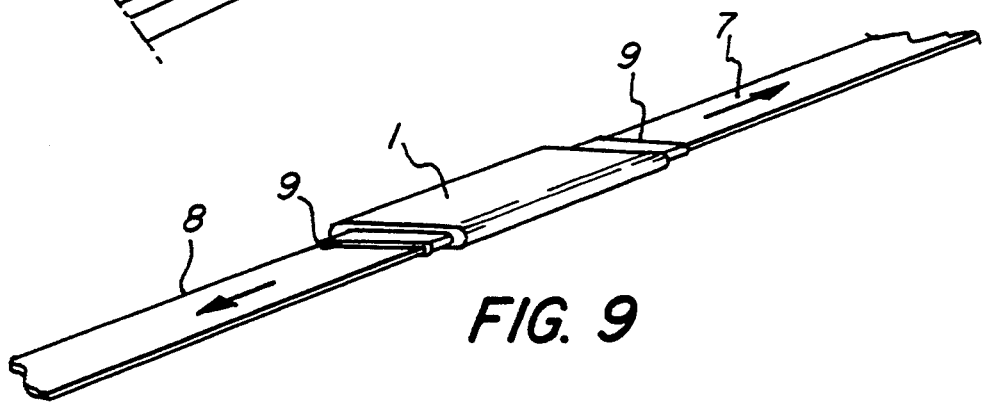
FIG. 9

FLEXIBLE COUPLINGS FOR FLEXIBLE TUBES DESIGNED TO BE ROLLED UP FLAT ON THEMSELVES

FIELD OF THE INVENTION

The following invention relates to tube couplers, and more particularly to a flexible coupler which, when inserted between two flexible tubes, permits said tubes to double back upon themselves.

BACKGROUND OF THE INVENTION

The invention has for a subject a flexible device for coupling flexible tubes, to be rolled up on themselves. Traditional couplings have solid parts, and in view of their somewhat large diameter, considerably hinder the regularity of rolling them up, being given that the tubes are placed flat.

The flexible device, according to the invention, permits remedying this disadvantage and introduces the following advantages: flexibility, correct rolling up, increased space, improved efficacy, no joint to change, and the assembly does not undergo the classical shocks from handling. Made of sheet rubber, it is light, and does not damage the tubes when they are rolled up.

The invention therefore has for a subject a flexible assembly designed for coupling flexible tubes comprising a sleeve designed to receive the ends of two tubes to be coupled and provided with assembly means designed to cooperate with complementary assembly means carried by the ends of said tubes, characterized in that the assembly means of the sleeve have an annular chamber arranged in the internal wall of the sleeve, and the edges of which form shoulders with reflex angles giving to it, in axial section, a dovetailed profile, and in that the complementary assembly means carried by the tubes to be coupled are made up of tubular stops permanently attached onto the ends of the tubes, the stops having an outer diameter corresponding to the inner diameter of the annular chamber arranged in the sleeve and at least their edge designed to cooperate with the shoulder with the corresponding reflex angle of the chamber having a complementary inclined profile of that of the shoulder with the reflex angle, and in that the length of the annular chamber is greater than the sum of the lengths of the fixed stops on the tubes to be coupled.

According to one particular characteristic of the invention, the two edges of each of the stops have identical profiles in the form of inner chamfered edges, and the chamfered edges opposite to chamfered edges engaged in the shoulders with reflex angles of the annular chamber define a cavity with the portion of the corresponding inner wall of the annular chamber, permitting, under the effect of pressure, exerting on the lips formed by the chamfered edges an axial thrust on the stops and the tubes to which they are coupled and favoring the encasing of the edge of the stops in the shoulders with reflex angles of the annular chamber, and a radial thrust improving the tight seal.

A guiding line is drawn on the tubes downstream of the stops so as to proceed without hesitation in coupling manipulations.

The coupling process consists of the following steps in chronological order:

the end of each tube furnished with a stop is placed flat, folded in half in the longitudinal direction, then introduced into the sleeve held cylindrical, up to the guiding line for positioning the sleeve, the assembly is placed flat to better match the contours of the stop with those of the cavity of the sleeve, then is pulled back and forth to clamp the dovetail encasing.

SUMMARY OF THE INVENTION

The present invention relates to a flexible assembly for coupling the ends of flexible tubes together comprising a sleeve, which is sufficiently flexible to permit said tubes to be rolled up upon themselves, defining a longitudinal axis. The sleeve includes an internal wall defining an annular chamber and a pair of shoulders located on opposite sides of the annular chamber relative to each other. Each shoulder is formed by a surface inclined relative to the longitudinal axis. The flexible assembly includes a pair of stop portions which are sufficiently flexible to permit the tubes to be rolled up upon themselves. Each stop portion is coupled to the end of a flexible tube and defines an out diameter substantially corresponding to the inner diameter of the internal wall and is received in the annular chamber. An edge surface is inclined relative to the longitudinal axis of the sleeve for abutting against a respective shoulder of the sleeve, wherein the length of the annular chamber is greater than the length of the two stop portions in the direction of the longitudinal axis of the sleeve which defines an annular space within the annular chamber between the stop portions.

BRIEF DESCRIPTION OF THE DRAWING

The invention will be better understood by reading the description which follows, made in reference to the attached drawings, given solely by way of example and in which:

FIG. 1 is an elevated and sectional view of the sleeve of the coupling assembly according to the invention, FIG. 2 is an elevated and sectional view of a stop entering into the construction of the coupling assembly, FIG. 3 is a partial sectional view of two flexible tubes coupled by the coupling assembly according to the invention, FIG. 4 is an elevated view of the assembly of FIG. 3, FIGS. 5 to 9 show the successive phases of the coupling process by means of the assembly according to the invention.

DESCRIPTION OF THE PREFERRED EMBODIMENTS

In reference to these drawings, the flexible coupling is comprised of three elements:

1. a part called the "coupling sleeve" 1;
2. two parts called "stops" 5.

The coupling sleeve is a double female type (FIG. 1). It is of cylindrical form, chamfered at 2, 2' at each outer end preferentially at 45° (FIG. 1) so that during handling of the coupled tubes, this sleeve does not catch. In its interior an annular cavity or chamber is provided, designed to receive two stops 5 with a sufficient gap to execute the handling for assembly. This cavity has, in axial section, a dovetailed shape with angles 3, 3' of 45°. These angles have for a mission the catching of stops 5. The inner diameter of the annular cavity or chamber corresponds to the outer diameter of stops 5. Each end part 4, 4' of sleeve 1 has for an inner diameter the outer diameter of the tubes to be coupled. Cylindrical-shaped stops 5 (FIG. 2) each have the same shape and the same dimensions; their outer diameter corresponds to the inner diameter of the cavity cited above for the sleeve. Each is chamfered at its ends preferably at 45° at 6, 6' interiorly so as to be reversible. The inner diameter of the stops corresponds to the outer diameter of the tubes to be coupled. They are to be definitively attached to each end of tubes 7, 8 by vulcanization, by gluing, or other means. But there is also the possibility of making them at the same time as the tubes, in a single assembly. Sleeve 1 and stops 5 are made up of sheet rubber or other synthetic complex, flexible and air-tight. The sheet is coated in all its forms; its role is to give a resistance to these pieces so that they do not deform under the effect of pressure. Stops 5 placed at each end of the cavity of sleeve 1 leave between them a gap called cavity 6a. This cavity has for a role:

a) to permit the encasing or release of the tubes;
b) under the effect of pressure in this cavity, an axial thrust is exerted which separates the stops and the tubes, then constricts the encasing between the chamfered edges 6 of the stops and the shoulders with reflex angles 3, 3' of the annular cavity or chamber of the sleeve.

Moreover, the application of lips formed by chamfered edges 6' at the internal axial ends of the stops against the wall of the sleeve further improves the tight seal.

Tubes 7, 8 each have a guiding line 9 to execute the insertion in sleeve 1, during coupling.

In order to carry out a coupling, simple manipulations must be executed chronologically. One begins by taking the end of a tube 7 furnished with a stop 5, laying it flat (FIG. 5), then folding it in half in the longitudinal direction (FIG. 6), taking female sleeve 1 held cylindrical (FIG. 7) and introducing tube 7 furnished with a stop in the sleeve up to the encasement guiding line 9. By always keeping sleeve 1 cylindrical, one introduces the other tube 8 to be coupled after having folded it in half like tube 7. The following operation consists of placing the assembly flat to better match the contours of stops 5 with those of the cavity of the sleeve and finally to pull tubes 7 and 8 back and forth in order to assure the clamping at the level of the chamfered edges of stops 5 and the shoulders with reflex angles 3, 3' of the annular chamber. The 45° angles used for this design can be replaced by angles notably comprised between 30° and 90°, but the value of 45° remains the preferential value. These flexible couplings will be able to be used notably for packing tubes rolled up on themselves on a hose reel, etc., used by fire fighters.

I claim:

1. A flexible assembly for coupling the ends of flexible tubes together, comprising:

a sleeve which is sufficiently flexible to permit said tubes to be rolled up upon themselves defining a longitudinal axis and including an internal wall defining an annular chamber and a pair of shoulders located on opposite sides of the annular chamber relative to each other, each shoulder being formed by a surface inclined relative to the longitudinal axis;

a pair of stop portions, which are sufficiently flexible to permit said tube to be rolled up upon themselves, each being coupled to the end of a respective flexible tube and defining an outer diameter substantially corresponding to the inner diameter of the internal wall and received within the annular chamber, and an edge surface inclined relative to the longitudinal axis of the sleeve for abutting against a respective shoulder of the sleeve, wherein the length of the annular chamber is greater than the length of the two stop portions in the direction of the longitudinal axis of the sleeve defining an annular space within the annular chamber between the stop portions.

2. A flexible assembly as defined in claim 1, wherein each stop portion includes two edge surfaces on opposite ends of the stop portion relative to each other, each edge surface being defined by a chamfered edge on the inside surface of the respective stop portion, wherein internal pressure within the annular chamber urges the respective edge surfaces of the stop portions against the shoulders of the sleeve to enhance the seal between the stop portions and the sleeve.

3. A flexible assembly as defined in claim 2, wherein the surface of each shoulder is inclined at approximately the same degree as the abutting chamfered edge surface of the respective stop portion to enhance the seal between the stop portions and the sleeve.

4. A flexible assembly as defined in claim 1, wherein the sleeve and the stop portions are each formed of at least one of a synthetic material and sheet rubber.

5. A flexible assembly as defined in claim 1, wherein the sleeve is formed with an interior layer and an exterior layer and the shoulders are defined by edges of the interior layer.

6. A flexible assembly as defined in claim 1, wherein each shoulder and each edge surface is inclined relative to the longitudinal axis of the sleeve by an angle within the range of approximately 30° to 90°.

7. A flexible assembly as defined in claim 6, wherein each shoulder and each edge surface is inclined relative to the longitudinal axis of the sleeve by an angle of approximately 45°.

8. A flexible assembly as defined in claim 1, wherein each tube defines a guide line on an exterior surface of the tube for aligning the respective tube relative to the sleeve to facilitate assembly of the tubes within the sleeve.

9. A flexible assembly as defined in claim 1, wherein each stop portion is formed as a tubular member coupled to the end of the respective flexible tube.

* * * * *

UNITED STATES PATENT AND TRADEMARK OFFICE
CERTIFICATE OF CORRECTION

PATENT NO. : 5,366,258
DATED : November 22, 1994
INVENTOR(S) : Jean Lamouche

It is certified that error appears in the above-identified patent and that said Letters Patent is hereby corrected as shown below:

In Claim 1, (Col. 3, line 55, after "themselves" and before "defining" insert a comma --,--.

Signed and Sealed this

Twenty-fourth Day of January, 1995

*Attest:*

BRUCE LEHMAN

*Attesting Officer*  *Commissioner of Patents and Trademarks*